UNITED STATES PATENT OFFICE.

ALBERT BÄZNER, OF BIRKENFELD, GERMANY.

PROCESS OF MAKING METAL CHAINS OF ENTANGLED SOLDER-WIRE LINKS.

1,048,128. Specification of Letters Patent. Patented Dec. 24, 1912.

No Drawing. Application filed May 16, 1912. Serial No. 697,816.

*To all whom it may concern:*

Be it known that I, ALBERT BÄZNER, a subject of the German Emperor, and resident of Birkenfeld, Germany, have invented certain new and useful Improvements in Processes of Making Metal Chains of Entangled Solder-Wire Links, of which the following is a specification.

In order to state a partial review of the prior art, hitherto known processes of making metal chains, which have the object to effect a clean, durable soldering of single links, consist in that the chains are first perfectly finished, hung into each other, and then coated with a deoxidation agent, which fills the cutting joints. The dry crust produced is then removed from the outer surfaces by rubbing or brushing, and the chain is first put into a binding liquid and then into a pulverized protecting medium, which prevents the solder from flowing over the outer surfaces. Said latter process step is effected by to and fro shaking of the chains in the mass consisting of graphite or the like, it being unavoidable to prevent the fine dust from entering part of the joints if these lie somewhat farther apart from each other than necessary and the deoxidation agent, after drying, does not fill them out entirely. Consequently, such joints cannot be soldered over their whole cut surfaces and the soldering point is thus liable to break. The whole process makes it also conditional that the vertical joints be entirely covered by the protecting medium, so that the flowing of the solder cannot be observed, which is very important for carrying out the soldering process. Any occurring faults can, therefore, not be remedied by suitable steps during the process.

The improved process hereinafter described and forming the subject matter of the present invention, has the advantage over said known processes that, while allowing an entirely clean soldering, it offers further every security of perfectly filling out the vertical joints and excluding any faults, particularly for the reason that the joints remain uncovered until the process is finished.

The improved process is carried out as follows:—First, the solder cored wire is wound up to form spirals, which are then put into a solution of hepar and water until the metal is entirely coated with a sulfid layer, which makes the outer surfaces of the wire solderproof. In order to prevent particles of said sulfid layer from getting into the joints in the further course of the process, the solder wire spirals thus prepared are coated with a quickly drying varnish (for instance Zaponlack), which protects the solderproof cover against any attack by friction and the like. Thereupon, the spirals, which are wound upon a pin or the like, are sawed transversely to the winding into single ring links or cut after each other, said links being then hung into each other or entangled by hand or by any of the known mechanical contrivances, to form the chain. Finally, the chain thus formed is led through a soldering oven or soldered in any other way. The sulfid layer disappears by the soldering heat, in decomposing into its ingredients, the sulfur burns and the metal is left in its original condition. This reaction follows from the fact that, if for instance thin layers of silver sulfid ($A_2S$) are heated in the air, the same is oxidized to sulfate of silver ($Ag_2SO_4$), which at a still higher temperature is decomposed into argentic oxid ($Ag_2O$) and sulfuric anhydrid ($SO_3$). Argentic oxid, when heated above 300° centigrade, decomposes into metal and oxygen. As the soldering temperature always exceeds said limit, and the sulfuric anhydrid is vaporized, finally always the silver alone will be left.

The main advantage of the improved process lies in the fact that the cutting of the wire spirals is effected but immediately before the soldering, whereby the cut surfaces of the joints remain absolutely clean and the joints remain visible up to the last moment, so that the flowing of the solder can be exactly observed and consequently the soldering process regulated.

I claim:—

1. A process of making metal chains of entangled solder cored wire links, consisting in winding solder cored wire into spirals, putting said spirals into a solderproofing solution, providing them thereby with a solderproof cover, coating them with a quickly drying varnish, then cutting them into single links, hanging said links into each other to form a chain, and finally soldering said chain, for the purpose set forth.

2. A process of making metal chains of entangled solder cored wire links, consisting in winding solder cored wire into spirals, coating said spirals first with a sulfid layer and then with a quickly drying varnish layer, then cutting them into single links, hanging said links into each other to form a chain, and finally soldering said chain, destroying thereby the sulfid layer and leaving the metal in its original condition, for the purpose set forth.

In testimony whereof I have hereunto set my hand in the presence of two subscribing witnesses.

ALBERT BÄZNER.

Witnesses:
 CARL ALT,
 MAX ALT.